June 20, 1950   J. WEINGARTEN   2,511,888
RADIO TUNING SYSTEM
Filed May 22, 1946
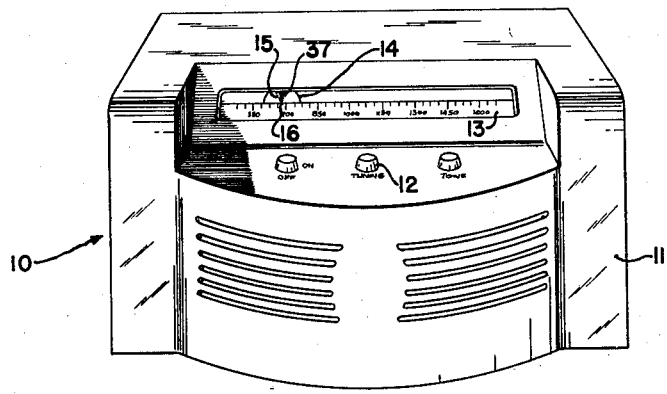
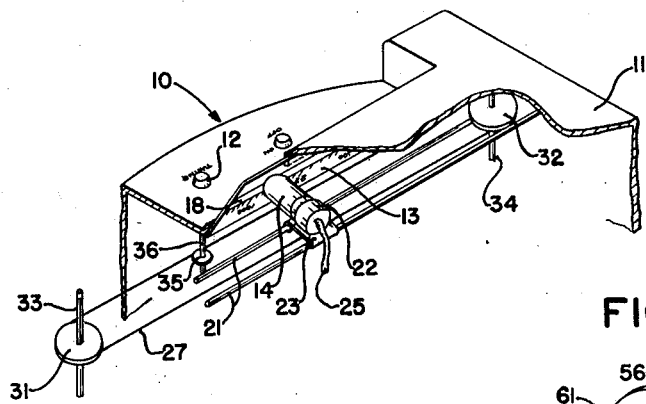
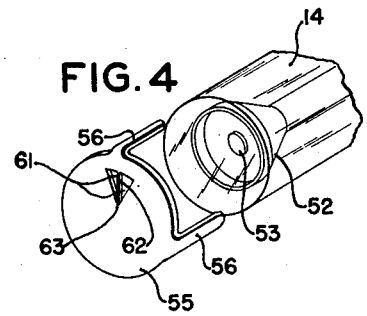
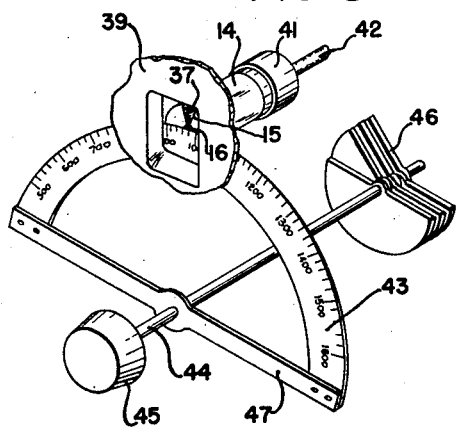
INVENTOR
JOSEPH WEINGARTEN
BY *M. A. Hayes*
ATTORNEY Patented June 20, 1950

2,511,888

UNITED STATES PATENT OFFICE 2,511,888

RADIO TUNING SYSTEM

Joseph Weingarten, United States Navy, New York, N. Y.

Application May 22, 1946, Serial No. 671,486

8 Claims. (Cl. 250—16)

(Granted under the act of March 3, 1883, as amended April 30, 1928; 370 O. G. 757)

This invention relates in general to a novel electronic scale index, and more particularly to a tuning system incorporating an electron ray tube indicator and a calibrated scale, indicator and scale being relatively movable.

The electron ray tube, also known as the "magic eye" or "tuning eye" comprises essentially, a central cathode structure common to a circular, fluorescent target or indicator electrode and a triode amplifier. A rod-like ray control electrode is disposed between the cathode and the target electrode, and is directly connected to the triode plate. Consequently, the relative potential of the ray control electrode is a function of the control potential applied to the triode grid. Those electrons emitted from the cathode which strike the target electrode cause it to fluoresce and provide a luminous area. The extent of this luminous area is governed by the ray control electrode potential relative to the target potential, and in normal operation the ray control electrode produces an angular shadow upon the illuminated fluorescent screen. The shadow angle is a function of the instantaneous triode grid control potential.

Electron ray tubes are particularly inexpensive devices, and are in wide use as visual indicators in electrical equipment. In radio, the principal application is a visual indicator of the accuracy of tuning. For this purpose, the electron ray tube is connected into the radio circuit such that the negative automatic volume control (AVC) bias is applied as a control potential to the triode section grid. As the radio is tuned to a signal, the AVC bias becomes stronger and the electron ray shadow angle decreases (the eye closes). The shadow angle is at a minimum when tuning is most accurate; that is, when the strength of the received signal is a maximum.

In prior radio tuning systems, the arrangement of the electron ray tube was substantially independent of the means for indicating the frequency of the received signal. Generally, the physical separation between the pointer indicating signal frequency on a calibrated scale and the electron ray tube made it inconvenient to follow simultaneously both pointer and the changes in tube shadow angle when tuning to a desired signal.

The present invention contemplates and has as a primary object the utilization of an electron ray tube as a scale index, the scale and tube being relatively movable.

Another object of the present invention is to provide a radio scale index which provides an indication of the accuracy of tuning to a received signal.

A further object of the present invention is to provide a tuning system wherein the vertex of the angular shadow presented by an electron ray tube is utilized as an index for a scale.

These and other objects of the present invention will now become apparent from the following detailed specification when taken in connection with the accompanying drawings in which, Fig. 1 is a general perspective view of a radio incorporating novel tuning principles, Fig. 2 is a broken perspective view of one possible embodiment of the tuning apparatus associated with the radio of Fig. 1, Fig. 3 is a fragmentary perspective view of an alternate tuning apparatus, and Fig. 4 is an exploded perspective view illustrating an electron ray tube and an index shield therefor.

Referring now to the drawings and more particularly to Figs. 1 and 2, there is illustrated a "table model" radio 10 which comprises essentially an enclosure or cabinet 11 of suitable design, having a plurality of conventional controls, such as tuning control 12, associated therewith. All details specific to circuit design and construction have been omitted from the drawings, inasmuch as these are not essential to an understanding of the present invention.

Associated with radio 10 is an opaque scale 13, printed or otherwise marked upon a transparent strip 18, suitably secured to cabinet 11. Scale 13 is calibrated in terms of frequency, and covers the frequency band receivable by rotation of tuning control 12.

An electronic scale index comprising an electron ray tube 14, of the type hereinabove described, is disposed within cabinet 11 behind transparent strip 18, and is oriented so that the wedge-shaped shadow 15 appearing on the fluorescent target electrode thereof is visible from the front of radio 10. As best illustrated in Fig. 1, the vertex 16 of the angular shadow 15 appears substantially in contact with the upper edge of scale 13.

As illustrated in Fig. 2, electron ray tube 14 is movable relative to scale 13. Thus, tube 14 is secured within a tube socket 22, which in turn is supported upon a carriage 23. Socket 22 is preferably rotatable so that the angular shadow 15 may be aligned as shown in Fig. 1 subsequent to installation of tube 14. Carriage 23 slidably engages a pair of parallel rails 21, fixed to the radio cabinet 11 in a suitable manner and is in addition attached by means not illustrated to and endless, taut string 27 which extends about two freely rotatable pulleys 31 and 32, the latter being supported within the radio cabinet 11 upon shafts 33 and 34 respectively. String 27 is looped around a small pulley 35 secured to shaft 36 extending from the tuning control 12. An extension of shaft 36 (not shown) is utilized to drive the frequency tuning system, ordinarily in the form of variable capacitors or inductors, of radio 10.

Electron ray tube 14 is energized from the circuit of radio 10 over multi-conductor, flexible cable 25 extending from the base of tube socket 22. In addition to heater currents, tube 14 is supplied with triode plate potential, and triode grid potential. For tuning indications the latter potential is obtained from the radio AVC circuit, and is a negative maximum when radio 10 is accurately tuned to an incoming signal. Under these circumstances the angle of shadow 15 is a minimum.

Thus, from consideration of Figs. 1 and 2 it is evident that the rotation of tuning control 12 will drive electron ray tube 14 and its associated carriage 23 along rails 21, parallel to frequency calibrated tuning scale 13, while simultaneously tuning radio 10 over the frequency band for which it has been designed. As the frequency band is covered, each received signal, by affecting the aforementioned AVC circuit, causes the angle of shadow 15 to decrease to a minimum. The angle of shadow 15 increases as radio 10 is detuned. If the band covered includes a number of signals, the angle of shadow 15 will alternately "close" and "open" as tuning control 12 is rotated.

In accordance with the principles of this invention, electron ray tube 14, positioned as illustrated, provides a readily visible, convenient index for the markings of scale 13. While tube 14 traverses rails 21, vertex 16 of angular shadow 15 clearly indicates the frequency to which radio 10 is tuned, and such indication is substantially independent of variations in angle caused by corresponding AVC signal intensity variations. In tuning to a particular radio station where the frequency is known, control 12 is rotated in that direction which drives electron ray tube 14 toward the desired frequency as indicated on scale 13. Observation of the angular shadow 15 and the scale markings adjacent vertex 16 simultaneously provides indications of station frequency and accuracy of tuning thereto.

Although radio 10 as illustrated in Figs. 1 and 2 is representative of a type primarily suited for home use, the electron ray tube scale index shown may be employed equally well in connection with "communication" type radios and other tunable electronic apparatus. In such applications scale readings are often required with a high degree of precision. Accordingly a sharply defined index line 37 (Fig. 1) has been marked on the face of electron ray tube 14, bisecting the angle of shadow 15. Index line 37 is positioned in this manner by suitable test, and may extend diametrically across the face of the tube. In operation, rough frequency indications are obtained by use of the tube 14 as described above, and precise readings are obtained by careful observation of index line 37 and scale 13. It will be understood that for a radio as shown in Figs. 1 and 2, index line 37 is optional.

The general principles of apparatus using an electron ray tube movable relative to scale need not be applied solely to the straight scale illustrated in Figs. 1 and 2. Thus, the electron ray tube index may, by simple mechanical design be altered to traverse a path parallel to an adjacent cooperating scale of any desired configuration. As an example, the electron ray tube may be supported at the end of a pivoted arm, thereby providing an index for a fixed, circular tuning scale, while simultaneously providing tuning indications.

Fig. 3 is a representation of the elements of a radio tuning system utilizing an electron ray tube scale index, wherein the electron ray tube is fixed to the frame of the radio apparatus and the scale movable relative thereto. For clarity, elements of Fig. 3 corresponding to elements described in connection with Figs. 1 and 2, have been similarly designated. Thus, electron ray tube 14 is supported behind an escutcheon plate 39 within a socket 41, the latter preferably being rotatably secured (by means not shown) to the radio cabinet or chassis. Electron ray tube 14 is energized by multi-conductor cable 42 connected to the radio circuit for tuning accuracy indications as described above for Figs. 1 and 2. When energized tube 14 presents a variable angle shadow 15, the vertex 16 of which is oriented, by rotation of socket 41, to serve as an index for a rotatable arcuate scale 43. Scale 43 is fastened, by means of cross-arm 47, to a rotatable shaft 44 extending from tuning control 45. The radio tuning means, diagrammatically represented by rotatable capacitor plates 46, are also secured to shaft 44.

As is evident from Fig. 3, the selection of a desired radio station is accomplished by utilizing the vertex 16 of angular shaped shadow 15 as an index for adjacent scale 43 while simultaneously determining the accuracy of tuning thereto by inspection of the variations of the tube shadow angle.

As already mentioned in connection with Figs. 1 and 2, the broad principles involving the utilization of an electron ray tube as a tuning scale index need not be limited by specific mechanical details. Thus, the apparatus of Fig. 3 may be readily modified so that during rotation of control 45, a straight calibrated scale is displaced in front of the fixed electron tube 14, instead of arcuate scale 43. As in Fig. 1, an index line 37 (optional) is provided upon the face of tube 14 for precision scale reading.

In Fig. 4 there is illustrated on electron ray tube 14 as described in connection with Figs. 1, 2 and 3, and an opaque shield 55 which may be positioned over the tube face so that only the region immediately surrounding the angular shadow of the tube is visible. As shown, electron ray tube contains a fluourescent screen 52, luminous except for an angular shadow, as previously described, and a small, circular cap 53 for shielding stray light from the tube filament (not shown). The shield plate 55 shown displaced from the tube for clarity comprises essentially a circular disk having a plurality of integral tabs 56 extending therefrom. Tabs 56 serve to removably secure shield 55 to the face of electron ray tube 15.

Two small angular openings 61 are provided in the shield plate 55 and are oriented relative to the face of tube 14 so that the variable angle shadow appearing on fluorescent screen 52, when tube 14 is energized, is visible therethrough. The angular shadow is preferably symmetrically oriented with respect to index strip 62, formed by the shield element between openings 61. The common vertex 63 of angular openings 61 is displaced from the center of shield 55 by a small amount and is above the edge of light shield 53.

The combination of shield plate 55 and tube 14, as illustrated in Fig. 4 provides a compact index assembly for use in apparatus as in Figs. 1, 2 and 3. The index strip functions as index line 37 mentioned in connection with Figs. 1 and 3.

The electron ray tube index of this invention may be utilized upon electronic apparatus wherever a scale indication is required in addition to a visual indication of a particular circuit condition.

It is evident that electron ray tube 14 may be of conventional construction, or of a modified construction for adaptation to a particular system. Thus for miniature radios, it is preferable that the electron ray tube electrode structure be incorporated within an extremely small (subminiature) envelope. In order to increase effectiveness, the cathode structure of the electron ray tube may be displaced from its normal central position and a non-symmetrical target electrode associated therewith to provide a maximum size angular shadow.

In view of these and other possible modifications of the specific disclosures hereinabove set forth which may now become apparent to those skilled in the art, it is preferred that the spirit and scope of the present invention be limited solely by the appended claims.

The invention described herein may be manufactured and used by or for the Government of the United States of America for governmental purposes without the payment of any royalties thereon or therefor.

What is claimed is:

1. A tuning system for a radio receiver comprising, a calibrated scale, an electron ray tube electrically coupled to said radio receiver and presenting a variable angle shadow, the angle of said shadow being a minimum when said radio is accurately tuned to a received signal, means for supporting said electron ray tube adjacent to said calibrated scale, said means being arranged whereby a line of sight directed axially of said tube substantially includes the vertex of said variable angle shadow and said calibrated scale, said vertex of said variable angle shadow thereby providing a visual index for said calibrated scale, and means operative during the tuning of said radio receiver for displacing said electron ray tube along said calibrated scale.

2. A tuning system for a radio receiver comprising, a substantially straight calibrated scale, an electron ray tube electrically coupled to said radio receiver and presenting a variable angle shadow, the angle of said shadow being a minimum when said radio is accurately tuned to a received signal, a carriage supporting said electron ray tube adjacent said straight scale and arranged whereby a line of sight directed axially of said tube substantially includes the vertex of said shadow angle and an edge of said straight calibrated scale, said vertex of said variable angle shadow thereby providing a visual index for said straight scale, and means operative during the tuning of said radio receiver for displacing said electron ray tube supporting carriage parallel to said straight scale.

3. A tuning system for a radio receiver comprising, a scale, an electron ray tube electrically coupled to said radio receiver and presenting a variable angle shadow, said scale and said electron ray tube being relatively movable, a shield positioned over the face of said electron ray tube, two substantially angular openings in said shield separated by an index strip, said angular openings having a common vertex, said variable angle shadow being visible through said openings, said electron ray tube and said shield being disposed relative to said scale whereby said common vertex and said index strip together provide an index for said scale.

4. An indicating system for electrical apparatus comprising, a scale bearing markings thereon and an electron ray tube presenting a variable angle shadow indicative of an electrical characteristic of said apparatus, said electron ray tube and said scale being arranged for predetermined relative movement throughout which said scale and said electron ray tube remain adjacently disposed, said variable angle shadow thereby providing an index for said scale, said scale and said electron ray tube being further arranged whereby a line of sight substantially axial of said electron ray tube and directed toward said variable angle shadow extends substantially normal to the plane of and in intersecting relationship with said markings of said scale.

5. A tuning system for a radio receiver comprising, a scale having markings related to the frequency range tunable by said receiver, an electron ray tube electrically coupled to said radio receiver and presenting a variable angle shadow, the angle of said shadow being a minimum when said receiver is accurately tuned to a received signal, index means disposed on the face of said electron ray tube substantially bisecting said variable angle shadow, means for supporting said electron ray tube behind and closely adjacent to said scale and arranged whereby on a line of sight axial of said electron ray tube the vertex of said variable angle shadow and said index means together indicate on said scale the frequency to which said radio receiver is tuned, and means operative during the tuning of said radio receiver for causing relative displacement of said electron ray tube and said scale while retaining the aforesaid adjacent relationship therebetween.

6. An indicating system for electrical apparatus comprising a calibrated arcuate scale, an electron ray tube in circuit with said apparatus and presenting an angular shadow variable in accordance with an electrical characteristic of said apparatus, means for supporting said electron ray tube adjacent to the calibrations of said arcuate scale whereby the vertex of said angular shadow is directed toward and provides a visual index for said calibrated scale and a line of sight axial of said electron ray tube, including said vertex, intersects the calibrations of said scale, and means operative during predetermined adjustment of said electrical apparatus for causing rotation of said arcuate scale while maintaining the aforesaid relationship of said scale to said electron ray tube, said electron ray tube being substantially fixed and displaced radially of the center of rotation of said arcuate scale.

7. An indicating system for electrical apparatus comprising, a scale bearing predetermined markings thereon, an electron ray tube electrically coupled to said apparatus and presenting an angular shadow variable in accordance with an electrical characteristic of said apparatus, said scale and said electron tube being relatively movable, a shield positioned over the face of said electron tube, said shield having an angular opening formed therein and arranged whereby said shadow is visible therethrough, said electron ray tube and said shield being disposed adjacent to and providing an index for said scale, a line of sight axial of said tube, including the vertex of said angular opening, being arranged to intersect said scale markings.

8. An indicating system for electrical apparatus comprising, a calibrated scale, an electron ray tube in circuit with said apparatus and presenting an angular shadow variable in accordance with an electrical characteristic of said apparatus, said electron ray tube having a line marked on the face thereof substantially bisecting the angle of said shadow, means for supporting said electron ray tube behind and directly adjacent to said calibrated scale, the longitudinal axis of said electron ray tube extending substantially through the calibrations on said scale, means operative during a predetermined adjustment of said electrical apparatus for causing relative displacement of said electron ray tube and said calibrated scale while maintaining the aforesaid relationship between said tube longitudinal axis and said calibrations on said scale, said variable angle shadow being pointed toward and thereby providing a visual index for the calibrations on said scale, said line on the face of said electron ray tube being visible at the edge of said scale and thereby providing means for taking accurate readings of the calibrations on said scale.

JOSEPH WEINGARTEN.

REFERENCES CITED

The following references are of record in the file of this patent:

UNITED STATES PATENTS

| Number | Name | Date |
|---|---|---|
| 2,124,023 | Albright et al. | July 19, 1938 |
| 2,160,270 | Kenney | May 30, 1939 |
| 2,176,673 | Krause | Oct. 17, 1939 |
| 2,194,169 | Metcalfe | Mar. 19, 1940 |
| 2,347,977 | Lieshant | May 2, 1944 |